US009304631B2

(12) United States Patent
Kang et al.

(10) Patent No.: US 9,304,631 B2
(45) Date of Patent: Apr. 5, 2016

(54) TOUCH SCREEN PANEL

(75) Inventors: Sung-Ku Kang, Yongin (KR); Jung-Mok Park, Yongin (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 46 days.

(21) Appl. No.: 12/926,757

(22) Filed: Dec. 8, 2010

(65) Prior Publication Data
US 2011/0242017 A1 Oct. 6, 2011

(30) Foreign Application Priority Data
Apr. 1, 2010 (KR) .................. 10-2010-0029945

(51) Int. Cl.
G06F 3/041 (2006.01)
G06F 3/044 (2006.01)
G06F 3/045 (2006.01)

(52) U.S. Cl.
CPC ............... *G06F 3/044* (2013.01); *G06F 3/045* (2013.01)

(58) Field of Classification Search
CPC ............................. G06F 3/044; G06F 3/0412
USPC ................ 345/173; 349/96, 158; 359/488.01
See application file for complete search history.

(56) References Cited

U.S. PATENT DOCUMENTS

| 2005/0219230 A1* | 10/2005 | Nakayama et al. ........... 345/173 |
| 2006/0056030 A1* | 3/2006 | Fukuda et al. ................ 359/586 |
| 2007/0242054 A1* | 10/2007 | Chang et al. ................. 345/173 |
| 2008/0158183 A1* | 7/2008 | Hotelling et al. ............. 345/173 |
| 2009/0087647 A1* | 4/2009 | Nakagawa et al. ........... 428/336 |
| 2009/0135492 A1* | 5/2009 | Kusuda et al. ............... 359/601 |
| 2010/0182253 A1 | 7/2010 | Park et al. |
| 2010/0296027 A1* | 11/2010 | Matsuhira et al. ............. 349/96 |
| 2011/0017524 A1* | 1/2011 | Chen et al. ................. 178/18.06 |
| 2011/0050620 A1* | 3/2011 | Hristov ........................ 345/174 |
| 2011/0187666 A1* | 8/2011 | Min .............................. 345/173 |
| 2012/0162130 A1* | 6/2012 | Liu et al. ...................... 345/174 |

FOREIGN PATENT DOCUMENTS

| KR | 10 2004-0043958 A | 5/2004 |
| KR | 10 2007-0082110 A | 8/2007 |
| KR | 10 2008-0102446 A | 11/2008 |
| KR | 10-0893498 B1 | 4/2009 |
| KR | 10-0921709 B1 | 10/2009 |

(Continued)

OTHER PUBLICATIONS

Korean Office Action in KR 10-2010-0029945, dated May 30, 2011 (Kang, et al.).

(Continued)

*Primary Examiner* — Calvin C Ma
(74) *Attorney, Agent, or Firm* — Lee & Morse, P.C.

(57) ABSTRACT

A touch screen panel includes a transparent substrate and an anti-scatter film disposed opposite to each other, a plurality of first sensing cells, the plurality of first sensing cells being disposed at a side of the transparent substrate that faces the anti-scatter film, the first sensing cells being connected along a first direction, a plurality of second sensing cells, the plurality of second sensing cells being disposed at a side of the anti-scatter film that faces the transparent substrate, the second sensing cells being connected along a second direction that intersects with the first direction, and an adhesive layer positioned between the transparent substrate and the anti-scatter film for bonding therebetween.

21 Claims, 3 Drawing Sheets

(56) References Cited

FOREIGN PATENT DOCUMENTS

| | | | |
|---|---|---|---|
| KR | 10 2010-0006987 A | 1/2010 | |
| KR | WO2010024542 * | 3/2010 | .............. G06F 3/041 |
| KR | 10-2010-0084255 A | 7/2010 | |
| TW | M359724 U | 6/2009 | |
| TW | M369503 U | 11/2009 | |
| TW | M371275 U | 12/2009 | |
| TW | 201003481 A | 1/2010 | |

OTHER PUBLICATIONS

Korean Office Action in KR 10-2010-0029945, dated Dec. 23, 2011 (Kang, et al.).

Korean Office Action in KR 10-2010-0029945, dated Sep. 30, 2011 (Kang, et al.).

Office Action dated Mar. 30, 2015 in corresponding Taiwanese Patent Application No. 99144324.

* cited by examiner

TOUCH SCREEN PANEL

BACKGROUND

1. Field

Embodiments relate to a touch screen panel.

2. Description of the Related Art

A touch screen panel may be used as an input device that selects, using a user's hand or an object to input commands of the user, contents displayed on a screen. The touch screen panel may be provided on a front face of a display, and may convert positions directly contacting the user's hand or the object into electrical signals. Accordingly, the instruction selected at the contact point may be received as an input signal. The touch screen panel may replace a separate input device, such as a keyboard and a mouse. Thus, the use of the touch screen panel is expanding.

SUMMARY

It is a feature of an embodiment to provide a touch screen panel having improved touch sensibility and improved durability.

It is another feature of an embodiment to provide a touch screen panel having a structure that is resistant to static electricity and scattering.

At least one of the above and other features and advantages may be realized by providing a touch screen panel, including a transparent substrate and an anti-scatter film disposed opposite to each other, a plurality of first sensing cells, the plurality of first sensing cells being disposed at a side of the transparent substrate that faces the anti-scatter film, the first sensing cells being connected along a first direction, a plurality of second sensing cells, the plurality of second sensing cells being disposed at a side of the anti-scatter film that faces the transparent substrate, the second sensing cells being connected along a second direction that intersects with the first direction, and an adhesive layer positioned between the transparent substrate and the anti-scatter film for bonding therebetween.

The touch screen panel may further include a transparent electrode layer, the transparent electrode layer being disposed at an opposite side of the anti-scatter film from the side having the second sensing cells.

The adhesive layer may be composed of an optically clear adhesive.

The first sensing cells and the second sensing cells may be disposed in a touch active region, and the touch screen panel may further include position detection lines, the position detection lines being respectively connected to the first sensing cells and the second sensing cells, and being disposed in a touch inactive region around the touch active region.

The touch screen panel may further include a black matrix corresponding to the touch inactive region, the black matrix being disposed at the side of the transparent substrate that faces the anti-scatter film, and an over-coating layer that completely covers the side of the transparent substrate having the black matrix, the over-coating layer being disposed between the first sensing cells and the transparent substrate, and between the position detection lines and the transparent substrate.

The first sensing cells and the second sensing cells may be alternately arranged so as to be free of overlap therebetween.

The first sensing cells may be patterned to be connected by connecting portions to adjacent first sensing cells disposed in a same row or column that extends along the first direction, and the second sensing cells may be patterned to be connected by connecting portions to adjacent second sensing cells in a same row or column that extends along the second direction.

The transparent substrate may be set as a window substrate disposed uppermost among substrates to be included in an image display device, and the first sensing cells, the second sensing cells, and the adhesive layer may be formed or attached on an under side of the transparent substrate opposite to a touch side of the transparent substrate.

At least one of the above and other features and advantages may also be realized by providing an image display device, including a transparent substrate and an anti-scatter film disposed opposite to each other, a plurality of first sensing cells, the plurality of first sensing cells being disposed at a side of the transparent substrate that faces the anti-scatter film, the first sensing cells being connected along a first direction, a plurality of second sensing cells, the plurality of second sensing cells being disposed at a side of the anti-scatter film that faces the transparent substrate, the second sensing cells being connected along a second direction that intersects with the first direction, an adhesive layer positioned between the transparent substrate and the anti-scatter film for bonding therebetween, and a display panel disposed adjacent to the anti-scatter film, the display panel being disposed at an opposite side of the anti-scatter film from the side having the second sensing cells.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
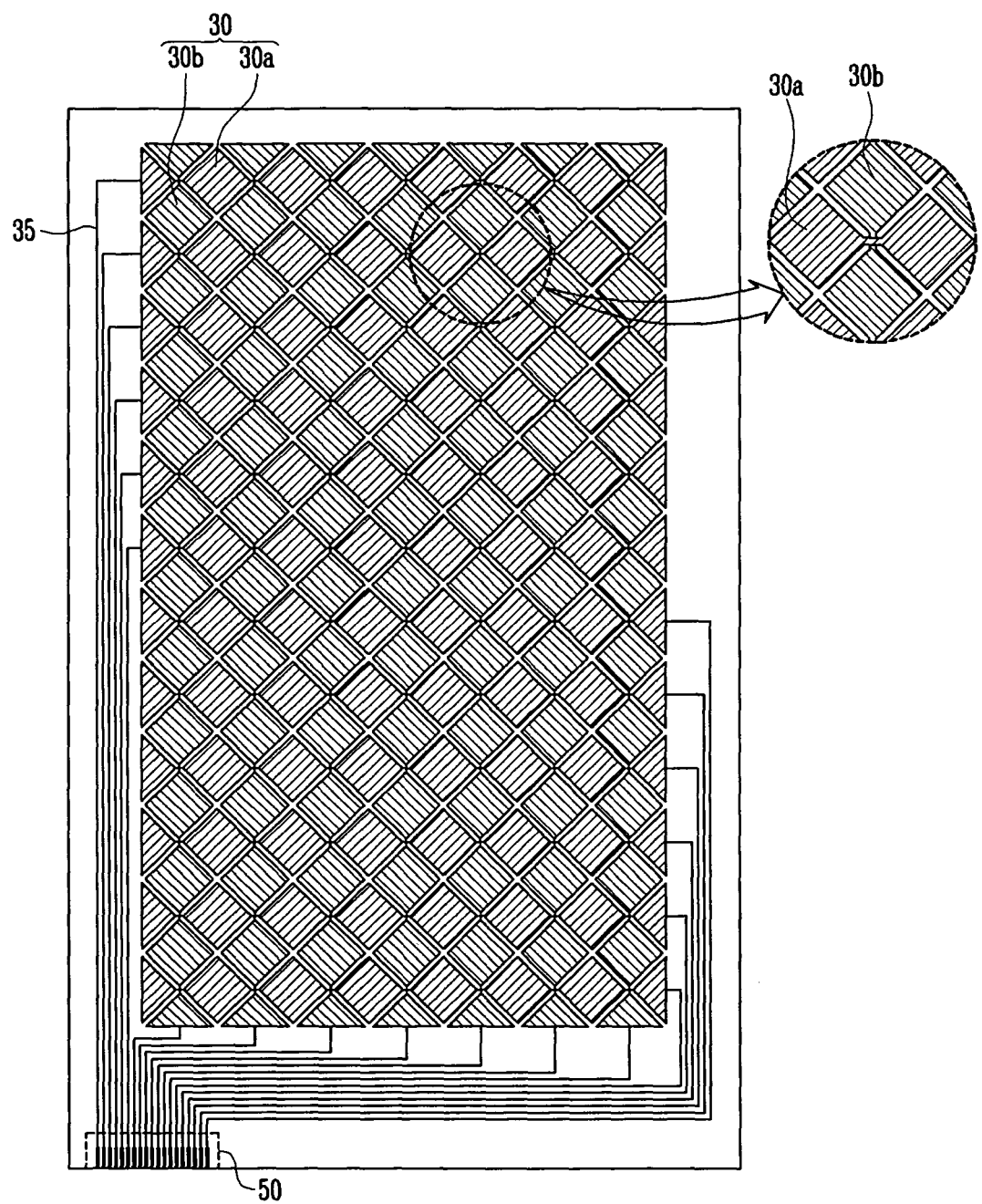
FIG. 1 illustrates a schematic plan view of a touch screen panel according to an embodiment.

Korean Patent Application No. 10-2010-0029945, filed on Apr. 1, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic plan view of a touch screen panel according to an embodiment.

Referring to FIG. 1, the touch screen panel may include a plurality of conductive sensing cells 30 formed in a touch active region, and position detection lines 35 formed in a touch inactive region around the touch active region.

The sensing cells 30 may be made from, e.g., a transparent electrode material such as indium-tin-oxide (ITO) in the touch active region. The sensing cells 30 may include the plurality of the first sensing cells 30a formed to be connected in a first direction, and the plurality of the second sensing cells 30b formed to be connected in a second direction intersecting with the first direction. An insulating layer may be disposed between the first sensing cells 30a and the second sensing cells 30b. The insulating layer may insulate between the first sensing cells 30a and the second sensing cells 30b at at least the intersection thereof.

The first sensing cells 30a may be formed to be connected in the first direction, e.g., in a row direction, and may be connected to the position detection lines 35 in the rows, respectively.

The second sensing cells 30b may be disposed between the first sensing cells 30a, and may be insulated from the first sensing cells 30a. The second sensing cells 30b may be formed to be connected along the second direction, rather than the first direction, e.g., in a column direction, and may be connected with the position detection lines 35 in the columns, respectively.

The position detection lines 35 may be connected with the sensing cells 30 in the rows and in the columns, respectively, and may be used to connect the sensing cells 30 to an external driving circuit such as the position detection circuit through a pad unit 50.

The position detection lines 35 may be positioned in the touch inactive region around the touch screen panel, rather than in the touch active region displaying the image. The position detection lines 35 may be formed of various materials, e.g., a low-resistance material such as Mo, Ag, Ti, Cu, Ti, Mo/Al/Mo, and the like, or the transparent electrode materials used for the sensing cells 30.

The touch screen panel may be a capacitive touch screen panel. When objects such as a person's hand, a stylus pen, and the like are contacted, a change of the electrostatic capacity according to the contact position may be transmitted from the sensing cells 30 to the driving circuit through the pad unit 50 and the position detection lines 35. The contact position may be determined by converting from the change of the electrostatic capacity to an electric signal through an X and Y input processing circuit (now shown).

According to an embodiment, the first sensing cells 30a and the second sensing cells 30b may be formed on different substrates from each other. A detailed description of such a configuration will now be described with reference to FIG. 2A.

Figure 2A:
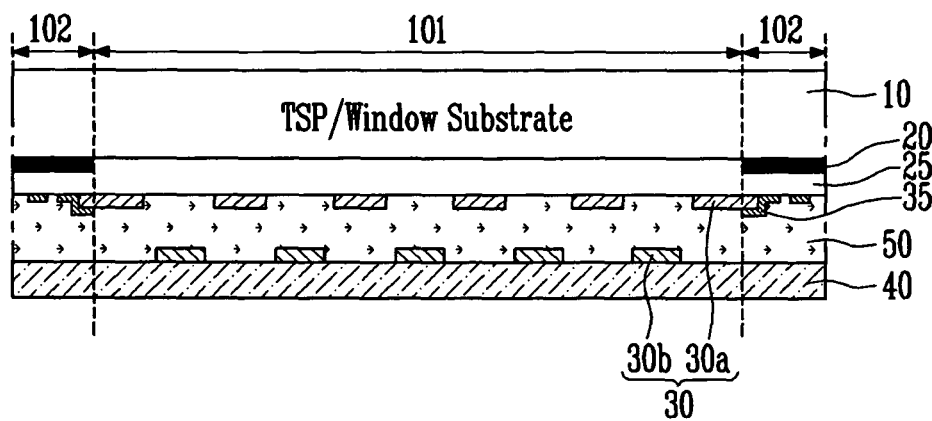
FIG. 2A illustrates a cross-sectional view of a touch screen panel according to an embodiment.

FIG. 2A illustrates a cross-sectional view of a touch screen panel according to an embodiment. For clarity, in FIG. 2A, the connecting portion that allows the first and the second sensing cells to be connected in the first and the second directions is not shown.

Referring to FIG. 2A, the touch screen panel according to an embodiment may include a transparent (TSP) substrate 10 and the anti-scatter film 40 disposed to be opposed each other, the plurality of the first sensing cells 30a formed at one side of the transparent substrate 10, the plurality of the second sensing cells 30b formed at one side of the anti-scatter film 40, and the adhesive layer 50 disposed between the transparent substrate 10 and the anti-scatter film 40 to couple them.

Thus, the touch screen panel may include the anti-scatter film 40 attached to the transparent substrate 10. The first sensing cells 30a and the second sensing cells 30b may be separately formed on the transparent substrate 10 and the anti-scatter film 10, respectively. The transparent substrate 10 formed with the first sensing cells 30a may be bonded to the anti-scatter film 40 formed with the second sensing cells 30b by an adhesive agent.

In an implementation, the transparent substrate 10 may be the outer material of the touch screen panel. The transparent substrate 10 may be formed of a transparent substrate material, e.g., glass, etc. In this case, the transparency means not only 100% transparency, but also transparency having a high light penetration rate.

The transparent substrate 10 may be set as the window substrate disposed to be the uppermost substrate among the substrates included in an image display device employing the touch screen panel. For example, referring to FIG. 2A, the uppermost surface of the transparent substrate 10 in FIG. 2 may be a touch side of the transparent substrate 10, i.e., a side contacted by a user's finger when the touch screen panel is being used as an input device.

A window all-in-one touch screen panel integrated with the window substrate and the transparent substrate 10 may be implemented by forming the patterns (i.e., the first sensing cells 30a) for implementing the touch screen panel on the window substrate. Thus, a thickness of the image display device employing the touch screen panel may be advantageously made thinner. Further, in the window all-in-one touch screen panel, the first and the second sensing cells 30a, 30b, the adhesive layer 50, and the like may be formed or attached on the under side opposite to the touch side (upper side) of the transparent substrate 10 for implementing the touch screen panel.

The transparent substrate 10 may be defined with a touch active region 101 and a touch inactive region 102 around the touch active region 101. The touch active region 101 may be a region available for touch input, and also can be set as the display region displaying the image by the display panel disposed on the under side of the touch screen panel. Thus, the touch active region 101 may be a region corresponding to a pixel region of the display panel, and also a region including the first and the second sensing cells 30a, 30b of the touch screen panel.

The touch inactive region 102 may be a region disposed at the edge portion of the touch active region 101, and disposed to overlap with the position detection lines 35, etc. In this case, the touch active region 102 of the transparent substrate 10 may be formed with a colored matrix 20, e.g., a black matrix, for reducing or obscuring visibility of patterns of the position detection lines 35, etc., in the under portion.

The touch screen panel according to the present embodiment may include the black matrix 20 formed to correspond to the touch inactive region 102 on the one side of the transparent substrate 10 toward the anti-scatter film 40, and an over-coating layer 25 may be formed to cover the side of the transparent substrate 10 including the black matrix 20. The over-coating layer 25 may be completely formed on one side of the transparent substrate 10, including the black matrix 20, so that the over-coating layer 25 is disposed between the first sensing cells 30a and the position detection lines 35, and the transparent substrate 10.

The anti-scatter film (ASF) may be formed of, e.g., a transparent polymer material such as polyethylene terephthalate (PET), so that the anti-scatter film attached on the transparent substrate 10 may improve a durability of the touch screen panel, e.g., prevent scattering, etc.

The first sensing cells 30a may be formed to be connected along the first direction on the one side of the transparent substrate 10 facing toward the anti-scatter film 40, as depicted in FIG. 1. The second sensing cells 30b may be formed to be connected along the second direction intersected with the first direction on the one side of the anti-scatter film 40 facing the transparent substrate 10. The second sensing cells 30b may be formed by patterning, after layering a transparent electrode material on the anti-scatter film 40. The second sensing cells 30b may be configured to be connected with the position detection lines 35 or the pad unit 50 (see FIG. 1), etc., e.g., via a conductive ball, and the like (not shown in FIG. 2A).

In an implementation, the first sensing cells 30a and the second sensing cells 30b may be alternately disposed so as not to overlap each other. However, the intersections of the connecting portions may overlap, as depicted in FIG. 1. For example, referring to the inset in FIG. 1, two first sensing cells 30a may disposed to be horizontally adjacent to one another, the two first sensing cells 30a being joined by a first connecting portion that extends horizontally therebetween and electrically connects the two first sensing cells 30a. Further, two second sensing cells 30b may disposed to be vertically adjacent to one another, the two second sensing cells 30b being joined by a second connecting portion that extends vertically therebetween and electrically connects the two second sensing cells 30b. The first connecting portion may cross the second connecting portion. In an implementation, the adhesive layer may separate and electrically insulate the first connecting portion from the second connecting portion.

In this case, the first sensing cells 30a and the second sensing cells 30b may include the adhesive layer 50 therebetween, and may be formed on different materials, i.e., the transparent substrate 10 and the anti-scatter film 40, respectively. Therefore, they may be patterned to be connected along the first direction and the second direction from the patterning step, respectively. Thus, the first sensing cells 30a may be patterned to be connected to adjacent first sensing cells disposed in same rows or columns along the first direction, and the second sensing cells 30b may be patterned to be connected to adjacent second sensing cells disposed in same rows or columns along the second direction.

In the embodiment described above, the need for further steps for forming connecting patterns and contact holes (for connecting the first sensing cells 30a or the second sensing cells 30b in the first direction or the second direction) may be avoided. Therefore, the manufacturing process may be simplified.

The adhesive layer 50 may be made of, e.g., a transparent insulated adhesive agent having a high transparency such as an optically cleared adhesive (OCA). The adhesive layer 50 may stably attach the anti-scatter film 40 formed with the second sensing cells 30b to the transparent substrate 10 formed with the first sensing cells 30a. In addition, the adhesive layer 50 may function as an insulating layer that insulates between the first sensing cells 30a and the second sensing cells 30b. In an implementation, the adhesive layer 50 may cover an entire surface of the touch active region.

In an embodiment, the transparent substrate may be a hard material, and may be attached with the anti-scatter film, which may be a soft material, by using the transparent insulating adhesive agent for implementing the insulating layer 50. Thus, the combining process may be more easily performed that, e.g., a process that depends on a vacuum process.

More specifically, a general touch screen panel may include opposing substrates that are each formed of hard materials. When bonding two substrates of such hard materials together, the bonding process may have to be performed under a vacuum condition. As such, the processing conditions may become more difficult. In contrast, according to an embodiment, the anti-scatter film 40 may be formed of a soft (or flexible) material and the transparent substrate 10 may be formed of a hard (or rigid) material. As such, the bonding process may be more easily performed because the anti-scatter film 40 may be simply attached to the transparent substrate 10 by, e.g., lamination, etc., using the adhesive agent. For example, the adhesive agent may be disposed between the anti-scatter film 40 and the transparent substrate 10, and the anti-scatter film 40 and the transparent substrate 10 may be pressed together in a non-vacuum ambient.

As described above, resistance to a disconnection generated by a scratch may be improved by preventing the scattering of the touch screen panel by including the anti-scatter film 40. In addition, the first sensing cells 30a and the second sensing cells 30b may be separately formed on the transparent substrate and the anti-scatter film, respectively. The transparent substrate formed with the first sensing cells and the anti-scatter film formed with the second sensing cells may be bonded by the insulating adhesive agent, thereby securing a separated distance between the first sensing cells and the second sensing cells.

When securing the separated distance between the first sensing cells 30a and the second sensing cells 30b, the insulating properties therebetween may be improved, and a transmission of static electricity can be reduced, so that the malfunction by static electricity can be prevented. In addition, when securing the separated distance between the first sensing cells 30a and the second sensing cells 30b, the touch sensibility may be improved.

For example, when increasing the separated distance between the first sensing cells 30a and the second sensing cells 30b, a base capacitance formed therebetween may be reduced, and changed by the touch event, so that the base capacitance formed therebetween may be more sensitively detected than a touch capacitance used in the position detection. Thus, SNR (signal-to-noise ratio) may be improved, so that a supersensitive touch screen panel may be implemented.

Figure 2B:
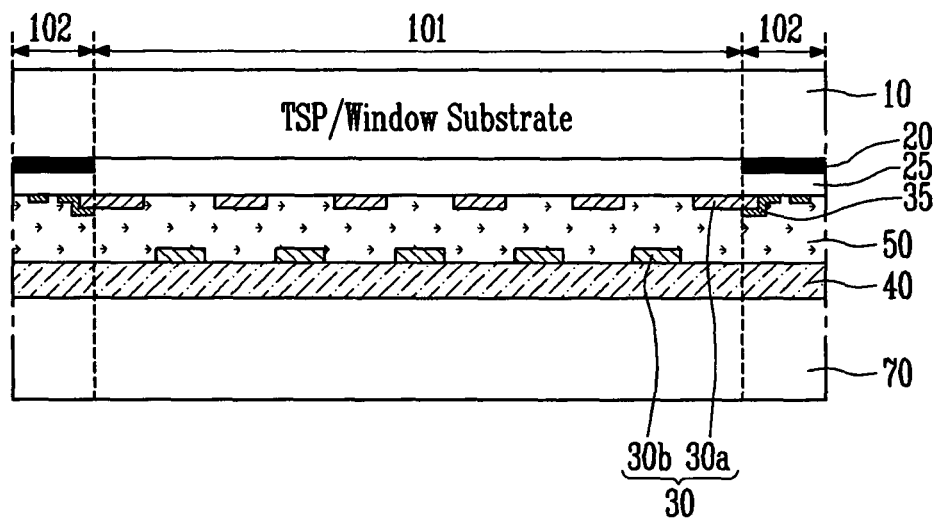
FIG. 2B illustrates a cross-sectional view of a touch screen display according to an embodiment.

FIG. 2B illustrates a cross-sectional view of a touch screen display according to an embodiment.

Referring to FIG. 2B, the touch screen display according to an embodiment further includes a display panel 70 disposed adjacent to the anti-scatter film 40. The touch screen display may be used in an electronic device, e.g., a portable electronic device such as a mobile phone handset, PMP, portable computer, etc., to serve as a display device and an input device.

Figure 3A:
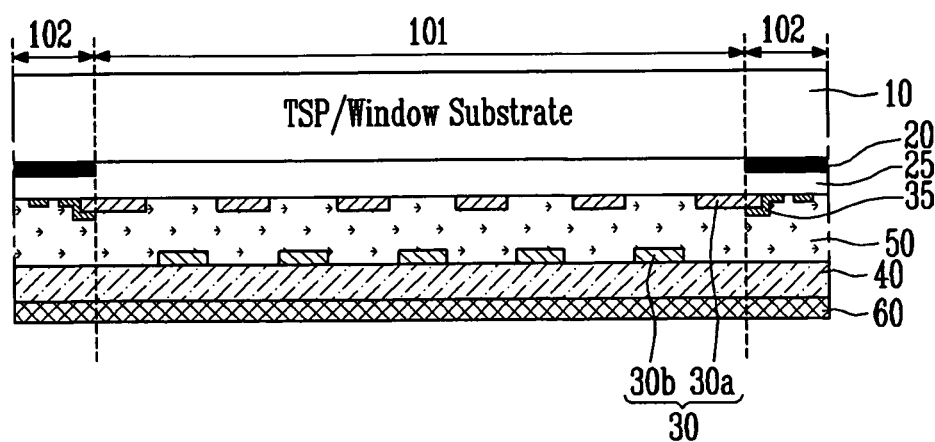
FIG. 3A illustrates a cross-sectional view of a touch screen panel according to an embodiment.

FIG. 3A illustrates a cross-sectional view of a touch screen panel according to an embodiment. In FIG. 3A, parts that are the same as those shown in FIG. 2A have the same reference numerals, and the description thereof will not be repeated.

Referring to FIG. 3A, the touch screen panel according to an embodiment may further include a transparent electrode layer 60 formed on the other side of the anti-scatter film 40, i.e., formed on the opposite side to the side having the second sensing cells 30b.

The transparent electrode layer 60 may be implemented as a ground electrode for securing stability between the touch screen panel and a display panel on the under portion thereof, or may be used for forming capacitance with the first and the second sensing cells 30a, 30b. The transparent electrode layer 60 may be completely formed on one side of the anti-scatter film 40 or patterned for having special patterns according to its application.

According to another embodiment, an additional driving electrode or ground electrode may be provided by forming the transparent electrode layer 60.

Figure 3B:
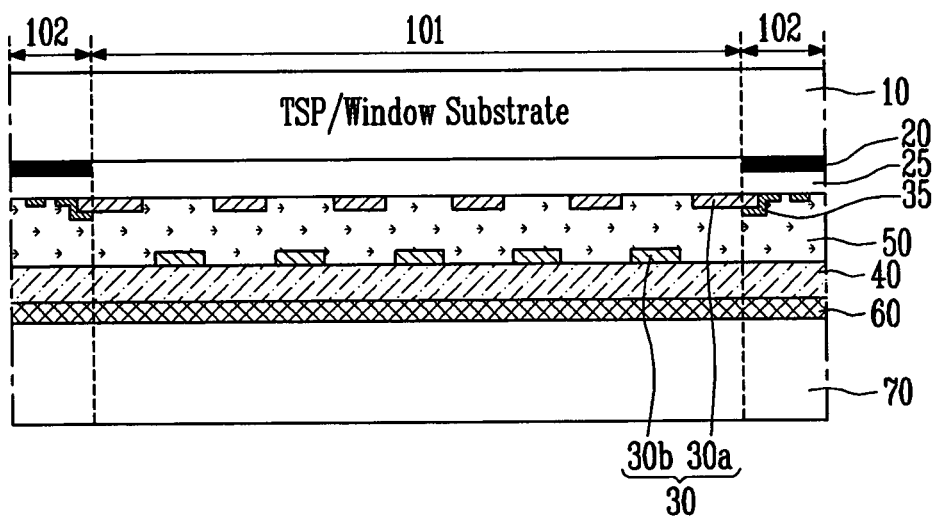
FIG. 3B illustrates a cross-sectional view of a touch screen display according to an embodiment.

FIG. 3B illustrates a cross-sectional view of a touch screen display according to an embodiment.

Referring to FIG. 3B, the touch screen display according to an embodiment further includes a display panel. 70 disposed adjacent to the transparent electrode layer 60. The touch screen display may be used in an electronic device, e.g., a portable electronic device such as a mobile phone handset, PMP, portable computer, etc., to serve as a display device and an input device.

A touch screen panel may be implemented as a resistive type, a light sensing type, a capacitive type, etc. When the user's hand or the object contacts the capacitive touch screen panel, a conductive sensing cell may sense a change in capacitance by other adjacent sensing cells or ground electrodes, etc., thereby converting the contacting position into the electrical signals. In order to clearly determine the contact position on the contacting surface, the sensing cell may be configured to include first sensing cells (X patterns) formed to be connected in a first direction and second sensing cells (Y patterns) formed to be connected in a second direction. Generally the first and the second sensing cells may be formed on a same substrate with an insulating layer therebetween (specifically, in their intersecting portion) for preventing a short between the first and the second sensing cells. However, the touch screen panel may be formed at an outer portion of a display, as compared with other elements such as a display panel, so that scattering, etc., may be easily produced by an external impact, and static electricity may be easily transmitted, thereby creating a possibility of malfunction.

As described above, embodiments relate to a touch screen panel that may be included in an image display device. According to the embodiment, the scattering of the touch screen panel may be prevented by including the anti-scatter film, thereby improving resistance to a disconnection generated by a scratch, etc. In addition, the first sensing cells connected in the first direction and the second sensing cells connected in the second direction may be divided and formed at the transparent substrate and the anti-scatter film, respectively. The transparent substrate formed with the first sensing cells and the anti-scatter film formed with the second sensing cells may be bonding by an insulating adhesive agent, thereby securing a separated distance between the first sensing cells and the second sensing cells. Thus, the insulating properties between the first sensing cells and the second sensing cells may be improved, a transmission of static electricity and a malfunction resulting therefrom may be prevented, and the touch sensitivity may be improved. In addition, because the transparent substrate as a hard material may be attached with the anti-scatter film as a soft material, the combining process may be easily performed without the need for a vacuum process.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A touch screen panel, comprising:
a rigid transparent substrate and a flexible anti-scatter film disposed opposite to each other, the transparent substrate defining a touch surface of the touch screen panel;
a plurality of first sensing cells, the plurality of first sensing cells being disposed at a side of the transparent substrate that faces the anti-scatter film, the first sensing cells being connected along a first direction;
a plurality of second sensing cells, the plurality of second sensing cells being disposed at a side of the anti-scatter film that faces the transparent substrate, the second sensing cells being connected along a second direction that intersects with the first direction; and
an adhesive layer positioned between the transparent substrate and the anti-scatter film for bonding therebetween, the adhesive layer being interposed between the first sensing cells and the second sensing cells such that the first sensing cells contact a first side of the adhesive layer and the second sensing cells contact a second side of the adhesive layer, the first side being opposite the second side, the adhesive layer being an insulating layer that insulates between the first sensing cells and second sensing cells.

2. The touch screen panel as claimed in claim 1, further comprising a transparent electrode layer, the transparent electrode layer being disposed at an opposite side of the anti-scatter film from the side having the second sensing cells.

3. The touch screen panel as claimed in claim 1, wherein the adhesive layer is composed of an optically clear adhesive, and the anti-scatter film is composed of a polymer.

4. The touch screen panel as claimed in claim 1, wherein:
the first sensing cells and the second sensing cells are disposed in a touch active region, and
the touch screen panel further includes position detection lines, the position detection lines being respectively connected to the first sensing cells and the second sensing cells, and being disposed in a touch inactive region around the touch active region.

5. The touch screen panel as claimed in claim 4, further comprising:
a black matrix corresponding to the touch inactive region, the black matrix being disposed at the side of the transparent substrate that faces the anti-scatter film; and
an over-coating layer that completely covers the side of the transparent substrate having the black matrix, the over-coating layer being disposed between the first sensing cells and the transparent substrate, and between the position detection lines and the transparent substrate.

6. The touch screen panel as claimed in claim 1, wherein the first sensing cells and the second sensing cells are alternately arranged so as to be free of overlap therebetween.

7. The touch screen panel as claimed in claim 6, wherein:
the first sensing cells are patterned to be connected by connecting portions to adjacent first sensing cells disposed in a same row or column that extends along the first direction, and
the second sensing cells are patterned to be connected by connecting portions to adjacent second sensing cells in a same row or column that extends along the second direction.

8. The touch screen panel as claimed in claim 1, wherein:
the transparent substrate is set as a window substrate disposed uppermost among substrates to be included in an image display device, and the first sensing cells, the second sensing cells, and the adhesive layer are between the transparent substrate and the image display device.

9. The touch screen panel as claimed in claim 8, wherein the anti-scatter film is between the image display device and the adhesive layer.

10. The touch screen panel as claimed in claim 1, wherein the anti-scatter film is a polyethylene terephthalate film.

11. The touch screen panel as claimed in claim 1, wherein the second side of the adhesive layer is in direct contact with the second sensing cells and with the anti-scatter film.

12. The touch screen panel as claimed in claim 11, wherein the adhesive layer completely fills a space between adjacent second sensing cells and between respective first and second sensing cells.

13. The touch screen panel as claimed in claim 1, wherein the adhesive layer covers an entire surface of a touch active region.

14. The touch screen panel as claimed in claim 13, further comprising an overcoat layer between the transparent substrate and the first sensing cells, the adhesive layer completely filling a space between the overcoat layer and the anti-scatter film, with the exception of the first and second sensing cells.

15. The touch screen panel as claimed in claim 1, wherein the first sensing cells are maintained at a constant predetermined distance relative to the second sensing cells.

16. The touch screen panel as claimed in claim 1, wherein a surface of the rigid transparent substrate is an outermost surface of the touch screen panel, the outermost surface being a rigid touch surface.

17. An image display device, comprising:
a transparent substrate and an anti-scatter film disposed opposite to each other;
a plurality of first sensing cells, the plurality of first sensing cells being disposed at a side of the transparent substrate that faces the anti-scatter film, the first sensing cells being connected along a first direction;
a plurality of second sensing cells, the plurality of second sensing cells being disposed at a side of the anti-scatter film that faces the transparent substrate, the second sensing cells being connected along a second direction that intersects with the first direction;
an adhesive layer positioned between the transparent substrate and the anti-scatter film for bonding therebetween, the adhesive layer being interposed between the first sensing cells and the second sensing cells such that the first sensing cells contact a first side of the adhesive layer and the second sensing cells contact a second side of the adhesive layer, the first side being opposite the second side, the adhesive layer being an insulating layer that insulates between the first sensing cells and second sensing cells; and
a display panel, the anti-scatter film being between the display panel and the second sensing cells.

18. The image display device as claimed in claim 17, wherein the transparent substrate is a rigid glass substrate, and the anti-scatter film is a flexible film.

19. The image display device as claimed in claim 18, wherein the transparent substrate defines an outermost surface of the touch screen panel, the outermost surface being a rigid touch surface.

20. The image display device as claimed in claim 19, wherein:
the first sensing cells are patterned to be connected by connecting portions to adjacent first sensing cells disposed in a same row or column that extends along the first direction,
the second sensing cells are patterned to be connected by connecting portions to adjacent second sensing cells in a same row or column that extends along the second direction, and
intersections of connecting portions of the first sensing cells and the second sensing cells overlap.

21. The image display device as claimed in claim 17, wherein the first sensing cells and the second sensing cells are alternately arranged so as to be free of overlap therebetween.

* * * * *